United States Patent
Appel et al.

(10) Patent No.: US 10,110,449 B2
(45) Date of Patent: Oct. 23, 2018

(54) METHOD AND SYSTEM FOR TEMPORAL SAMPLING IN EVOLVING NETWORK

(71) Applicant: International Business Machines Corporation, Armonk, NY (US)

(72) Inventors: Ana P. Appel, Sao Paulo (BR); Victor F. Cavalcante, Campinas (BR); Luis G. Moyano, Rio de Janerio (BR); Vagner F. de Santana, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/974,711

(22) Filed: Dec. 18, 2015

(65) Prior Publication Data

US 2017/0180221 A1   Jun. 22, 2017

(51) Int. Cl.
*G06F 15/173* (2006.01)
*H04L 12/26* (2006.01)

(52) U.S. Cl.
CPC .......... *H04L 43/067* (2013.01); *H04L 43/045* (2013.01); *H04L 43/12* (2013.01)

(58) Field of Classification Search
None
See application file for complete search history.

(56) References Cited

U.S. PATENT DOCUMENTS

| | | | |
|---|---|---|---|
| 5,724,605 A | 3/1998 | Wissner | |
| 6,975,655 B2 | 12/2005 | Fischer et al. | |
| 7,469,160 B2 | 12/2008 | Banks et al. | |
| 7,797,421 B1* | 9/2010 | Scofield | G06F 15/173 709/203 |
| 7,827,123 B1 | 11/2010 | Yagnik | |
| 8,214,484 B2 | 7/2012 | Arora et al. | |

(Continued)

FOREIGN PATENT DOCUMENTS

| CN | 103530503 A | 1/2014 |
|---|---|---|
| WO | 2013030436 A1 | 3/2013 |

OTHER PUBLICATIONS

Ahmed, et al., "Time-based Sampling of Social Network Activity Graphs", Proceedings of the Eighth Workshop on Mining and Learning with Graphs, ACM, 2010, pp. 1-9, Jul. 2010.

(Continued)

*Primary Examiner* — John B Walsh
(74) *Attorney, Agent, or Firm* — Scully, Scott, Murphy & Presser, PC; David M. Quinn, Esq.

(57) ABSTRACT

A method and system for analyzing temporal data includes selecting a data source in which data from the source contains temporal attributes, obtaining temporal data of a first size from the selected data source and mapping the temporal data from the selected source in a temporal graph. The method and system selects a temporal attribute, generates a time decay function of the selected temporal attribute and selects a time window in the temporal graph defining a data set of a second size less than the first size based on the time decay function. The data set contains a set of predefined properties, each having a metric calculated from data within the time window. The method and system samples data from the data source based on the selected time window and generates a temporal graph of the metrics of the predefined properties of the sampled network data.

20 Claims, 5 Drawing Sheets

(56) References Cited

U.S. PATENT DOCUMENTS

| | | |
|---|---|---|
| 8,566,165 B1 | 10/2013 | Zhang et al. |
| 2007/0019548 A1 | 1/2007 | Krishnamurthy |
| 2007/0089094 A1 | 4/2007 | Levine et al. |
| 2013/0159233 A1* | 6/2013 | Mason .............. G06F 17/30864 706/45 |
| 2013/0254206 A1 | 9/2013 | Count et al. |
| 2014/0095616 A1 | 4/2014 | White et al. |
| 2014/0283005 A1 | 9/2014 | Avni et al. |
| 2014/0313205 A1* | 10/2014 | Huempel .............. G06T 11/206 345/440 |

OTHER PUBLICATIONS

Hu et al., "A Survey and Taxonomy of Graph Sampling", Aug. 23, 2013, pp. 1-34.

Leskovec, et al., "Sampling from Large Graphs", Proceedings of the 12th ACM SIGKDD International Conference on Knowledge Discovery and Data Mining, ACM, 2006, pp. 1-8, Aug. 2006.

Ribeiro, et al., "Estimating and Sampling Graphs with Multidimensional Random Walks", Proceedings of the 10th ACM SIGCOMM Conference on Internet Measurement, ACM, 2010, pp. 390-403, Nov. 2010.

Shomorony et al., "Sampling Large Data on Graphs", Nov. 2014, pp. 1-4.

\* cited by examiner

METHOD AND SYSTEM FOR TEMPORAL SAMPLING IN EVOLVING NETWORK

BACKGROUND

This disclosure is directed to analyzing temporal data and in particular to providing a temporally meaningful a data sample of a network.

When dealing with data in the Rum of a graph, a very common issue is that the size of the resulting dataset can be unmanageable. One approach to solve this is to sample the graph to arrive at a smaller subset that, attends the needs of the problem in a similar way as the original data. Ideally this sampling process needs to preserve the original properties of the graph. Sampling large networks while preserving useful attributes is a complicated task. Sampling nodes or edges reduces the size of the network, but can make it disconnected and this may significantly alter its properties. In one approach uses network models to try to reduce graph size by inferring how these networks were created. In these cases, temporal information plays a key role in network analysis, but little attention has been paid to this information. Links can lose relevance over time and new links can gain more importance, depending on the network being modeled. This is true for several graph mining tasks, such as link prediction and community detection.

One of the main problems involved in temporal sampling is how to define the granularity of the sampling, especially in the cases where edges represent connections in years, months or hours.

Existing methods and systems providing sampling, features, such as temporal clustering, which clusters information based on time, do not keep these properties or create a graph that, is highly disconnected. Another problem is that, in many of the known approaches, the link temporality is not observed, thus an aged link has the same meaning/probability/importance as a new link, which in most real world situations is not true.

SUMMARY OF THE INVENTION

In one embodiment a method for analyzing temporal data to provide a temporally meaningful data sample is disclosed. The method includes selecting a data source in which data from the source contains temporal attributes, obtaining temporal data of a first size from the selected data source and mapping the temporal data from the selected source in a temporal graph. The method further includes selecting a temporal attribute, generating a time decay function of the selected temporal attribute arid selecting a time window in the temporal graph defining a data set of a second size less than the first size based on the time decay function, the data set containing a set of predefined properties of the temporal graph, each property having a metric calculated from data within the time window. Thereafter, the method includes sampling data from the data source based on the selected time window and generating a temporal graph of the metrics of the predefined properties of the sampled network data.

In one embodiment the method further includes presenting the selected time window and the calculated metrics of set of the predefined properties to a user interface, receiving an input on the user interface adjusting the time window and recalculating the metrics of the predefined properties based on the adjusted time window. Thereafter, the method includes presenting the recalculated metrics of the predefined properties to the user interface, sampling data from the data source based on the adjusted time window and generating a temporal graph of the recalculated metrics of the predefined properties of the sampled data.

In one embodiment the set of predefined properties includes one or more of degree distribution, distance, centrality measures, triangles, clustering coefficient and giant connected component. In one embodiment the data source is a network of nodes and links connecting the nodes. The time decay function may be derived from data which contains the information about how interactions in the links between the nodes decay. The time decay function may be in a form of one of a stepwise functional form, a linear functional form, an exponential functional form, polynomial functional form, logarithmic functional form and a power-law functional form. In one embodiment, the time decay function form is dependent on variables selected from the group consisting of nodes, links, node degree, link/node weights, link/node attributes graph topological variables, community information and diffusion information.

In another embodiment, a computer system for analyzing temporal data to provide a temporally meaningful data sample is disclosed which includes at least one computer processor and at least one database storing data from a plurality of data sources, the data containing temporal attributes. A user interface is configured to receive user inputs that include a selection of one of the plurality of data sources. A graph module is configured to obtain temporal data of a first size from the selected data source and transform the temporal data from the selected source into a temporal graph defining nodes, edges and temporal attributes. A function module is configured to generate a time decay function of a temporal attribute selected by the user through an input on the user interface and fit the time decay function into a temporal distribution of the selected temporal attribute in the temporal graph. A time window module is configured to select a time window in the temporal graph defining a data set of a second size less than the first size based on the time decay function, the data set containing a set of predefined properties of the temporal graph, each property having a metric calculated from data within the time window. A graphics metrics module is configured to calculate the metrics of the set of predefined properties. A data sampling module is configured to sample data from the data source based on the selected time window, generate a temporal subsample graph of the metrics of the predefined properties of the sampled network data and display the temporal subsample graph on the user interface.

In one embodiment, the graph module is configured to present the selected time window and the calculated metrics of set of the predefined properties to the user interface, in another embodiment, the graphics module is configured to recalculate the metrics of the predefined properties based on an input on the user interface adjusting the time window and present the recalculated metrics of the predefined properties to the user interface. In one embodiment, the data sampling module is configured to sample data from the data source based on the adjusted time window and generate a temporal subsample graph of the recalculated metrics of the predefined properties of the sampled data and display the temporal subsample graph of the recalculated metrics on the user interface.

In another embodiment, a non-transitory article of manufacture tangibly embodying computer readable instructions, which when implemented, cause a computer to perform the steps of a method for analyzing temporal data to provide a temporally meaningful data, sample is disclosed. The method includes selecting a data source in which data from the source contains temporal attributes, obtaining temporal data of a first size from the selected data source and mapping the temporal data from the selected source in a temporal graph. The method further includes selecting a temporal attribute, generating a time decay function of the selected temporal attribute and selecting a time window in the temporal graph defining a data set of a second size less than the first size based on the time decay function, the data set containing a set of predefined properties of the temporal graph, each property having a metric calculated from data within the time window. Thereafter, the method includes sampling data from the data source based on the selected time window and generating a temporal graph of the metrics of the predefined properties of the sampled network data.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF PREFERRED EMBODIMENTS

As noted above, one of the main problems involved in temporal sampling is how to define the granularity of the sampling (i.e., which is the optimal time window for sampling: years, months, hours, etc.). One embodiment of the present invention is a method and a system that, for a given network, analyzes the decay of information and produces a function in order to estimate the granularity of an optimal data sample. Once that the decay and granularity are identified, a sample is generated as a subset of the original network preserving as much as possible those characteristics that are important for a set of tasks, such as link prediction or community detection.

The method and system disclosed provides a solution to process a large volume of data represented as a graph of a complex network and output a temporal sample of this data that reduces the amount of data to be analyzed, but keeps all the important properties such as degree distribution, distance, such as number of hops and diameter, centrality measures, such a betweeness, eigenvalues and degrees, triangles, clustering coefficient, giant connect component, among others.

In one embodiment, the first user selects the data source where the sampling will be, extracted.

The data source should contain temporal attributes (e.g., timestamp) and should be mapped as a graph. (i.e., multiple entities and relationship among those entities). The user selects the temporal attribute to be evaluated. The system next analyses the data and generates a time decay function of the selected temporal attribute. The system then selects the best time window that will reduce the size of the data set, while keeping a set of relevant properties of the graph (e.g., degree distribution, distance, centrality measures, triangles, clustering coefficient and giant connected component. In one embodiment the user can adjust the time window in this case graph properties are recomputed and presented back to the user. The system then samples the network based, on the time window and returns the graph subsample to the user.

Figure 1:
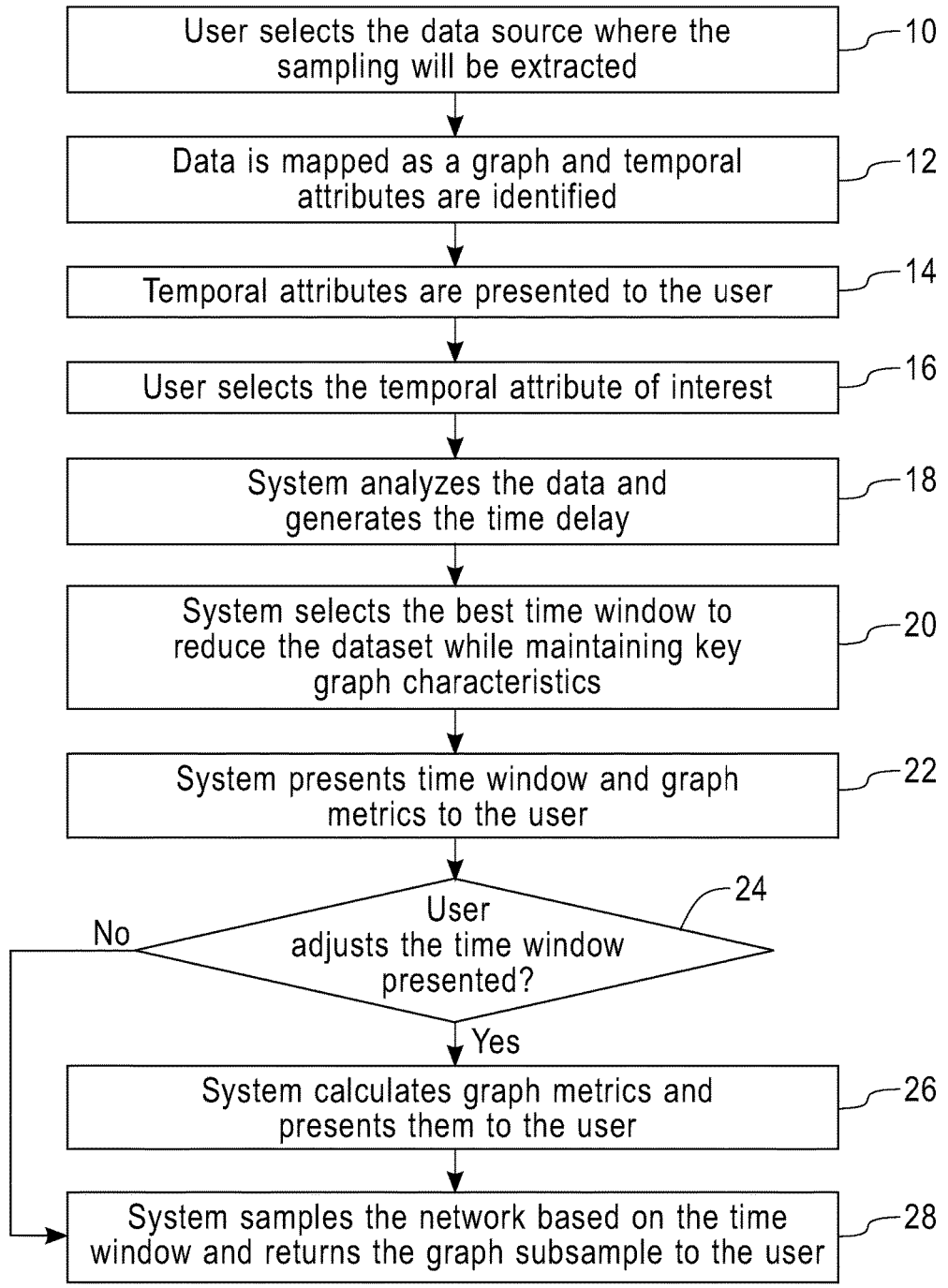
FIG. 1 is a flow chart showing the steps of the method of one embodiment of the present invention.

A flow chart of the steps of the method of one embodiment of the invention is shown in FIG. 1. The method starts at step 10 of selecting a data source in which data from the source contains temporal attributes. Next, obtaining at step 12 temporal data of a first size from the selected data source and mapping the temporal data from the selected source in a temporal graph. The method further includes at step 14 of presenting temporal attributes to the user and at step 16 the user selects a temporal attribute. At step 18 the system analyzes the data and generates a time decay function of the selected temporal attribute. At step 20, the system selects a time window in the temporal graph defining a data set of a second size less than the first size based on the time decay function. The data set contains a set of predefined properties of the temporal graph, each property having a metric calculated from data within the time window. The system optionally at step 22 presents the time window to the user and the user has the option at step 24 to adjust the time window. Thereafter, if the user does not adjust the time window. No at step 24, the method move to step 28 for sampling data from the data source based on the selected time window and generating a temporal graph of the metrics of the predefined properties of the sampled network data. If the system doe snot include the user adjustment, option, the method moves from step 22 to step 28.

If the system includes presenting the selected time window to the user, in one embodiment the calculated metrics of set of the predefined properties are also presented to a user interface. The system then receives an input on the user interface adjusting the time window, Yes at step 24. At step 26 the system recalculates the metrics of the predefined properties based on the adjusted time window. In one embodiment, the method includes presenting the recalculated metrics of the predefined properties to the user interface. At step 28 the system samples data from the data source based on the adjusted time window and generates a temporal graph of the recalculated metrics of the predefined properties of the sampled data.

In one embodiment the data source is a network of nodes and links connecting the nodes. The time decay function may be derived from data which contains the information about how interactions in the links between the nodes decay. The time decay function may be in a form of one of a stepwise functional form, a linear functional form, an exponential functional form, polynomial functional form, logarithmic fictional form and a power-law functional form. In one embodiment, the time decay function form is dependent on variables selected from the group consisting of nodes, links, node degree, fink/node weights, link/node attributes graph topological variables, community information and diffusion information.

Figure 2:
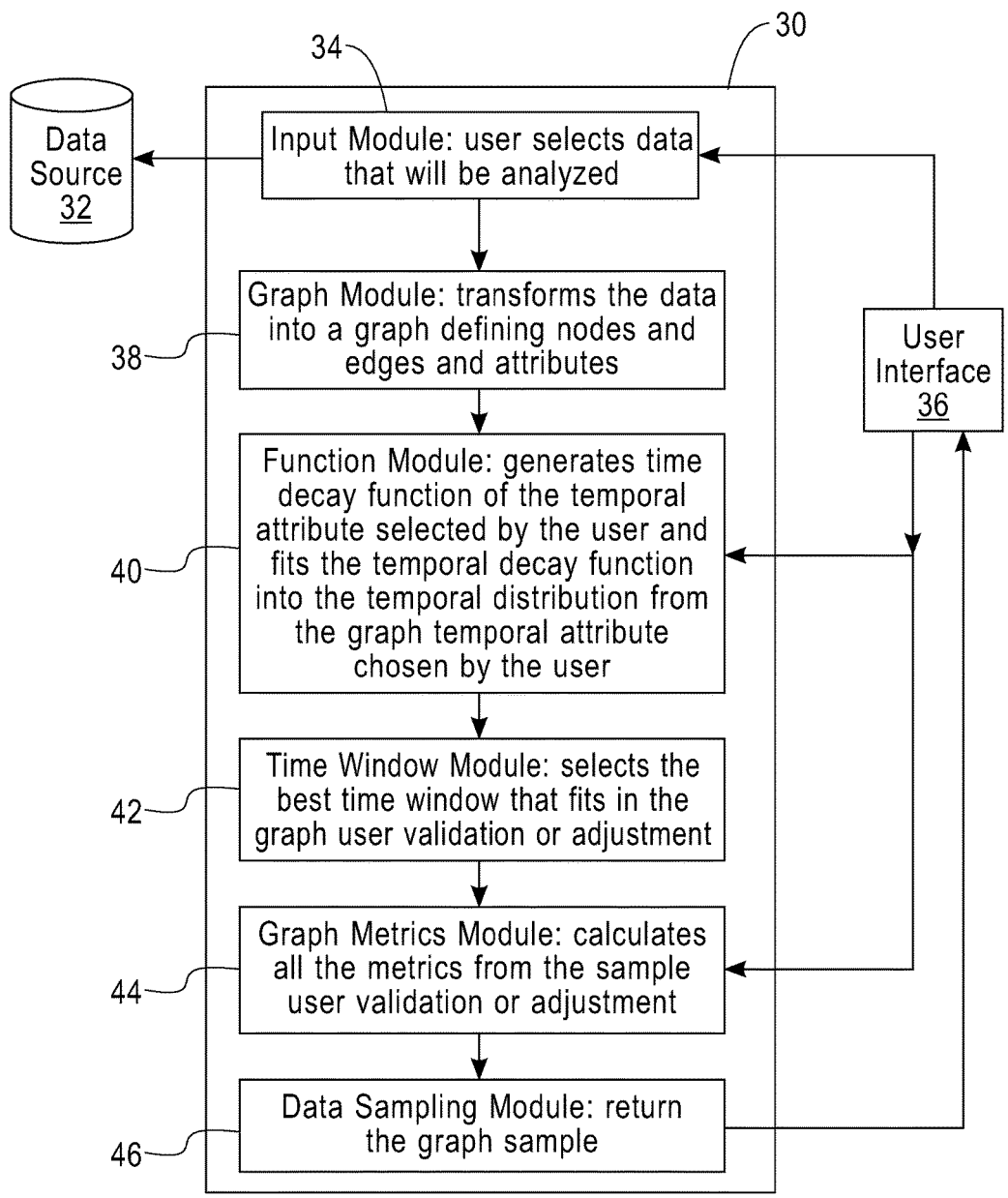
FIG. 2 is a block diagram showing the interaction of the elements of a computer system of one embodiment of the present invention.

FIG. 2 is a block diagram of one embodiment of a computer system for analyzing temporal data. The computer system includes at least one computer processor 30 and at least one database 32 storing data from a plurality of data sources in which the, data contains temporal attributes. A user interface module 34 is configured to, receive user inputs from a user interface 36 that includes a selection of one of the plurality of data sources. A graph module 38 is configured to obtain temporal data of a first size from the selected data source and transform the temporal data from the selected source into a temporal graph. The temporal graph may define nodes, edges and temporal attributes. A function module 40 is configured to generate a time decay function of a temporal attribute selected by the user through an input on the user interface 36 and fit the time decay function into a temporal distribution of the selected temporal attribute in the temporal graph. A time window module 42 is configured to select a time window in the temporal graph defining a data set of a second size less than the first size based on the time decay function. The data set contains a set of predefined properties of the temporal graph, each property having a metric calculated from data within the time window. The user optionally can validate or adjust the time window. A graphics metrics module 44 is configured to calculate the metrics of the set of predefined properties. The graphics module 44 also allows the user to optionally validate or adjust the time window. A data sampling module 46 is configured to sample data from the data source based on the selected time window, generate a temporal subsample graph of the metrics of the predefined properties of the sampled network data and display the temporal subsample graph on the user interlace 36.

In one embodiment, the graph module 44 is configured to present the selected time window and the calculated metrics of set of the predefined properties to the user interface 36. In another embodiment, the graphics module 44 is configured to recalculate the metrics of the predefined properties based on an input on the user interface 36 adjusting the time window and present the recalculated metrics of the predefined properties to the user interface 36. In one embodiment, the data sampling module 46 is configured to sample data from the data source based on the adjusted time window and generate a temporal subsample graph of the recalculated metrics of the predefined properties of the sampled data and display the temporal, subsample graph of the recalculated metrics on the user interface 36.

Figure 3:
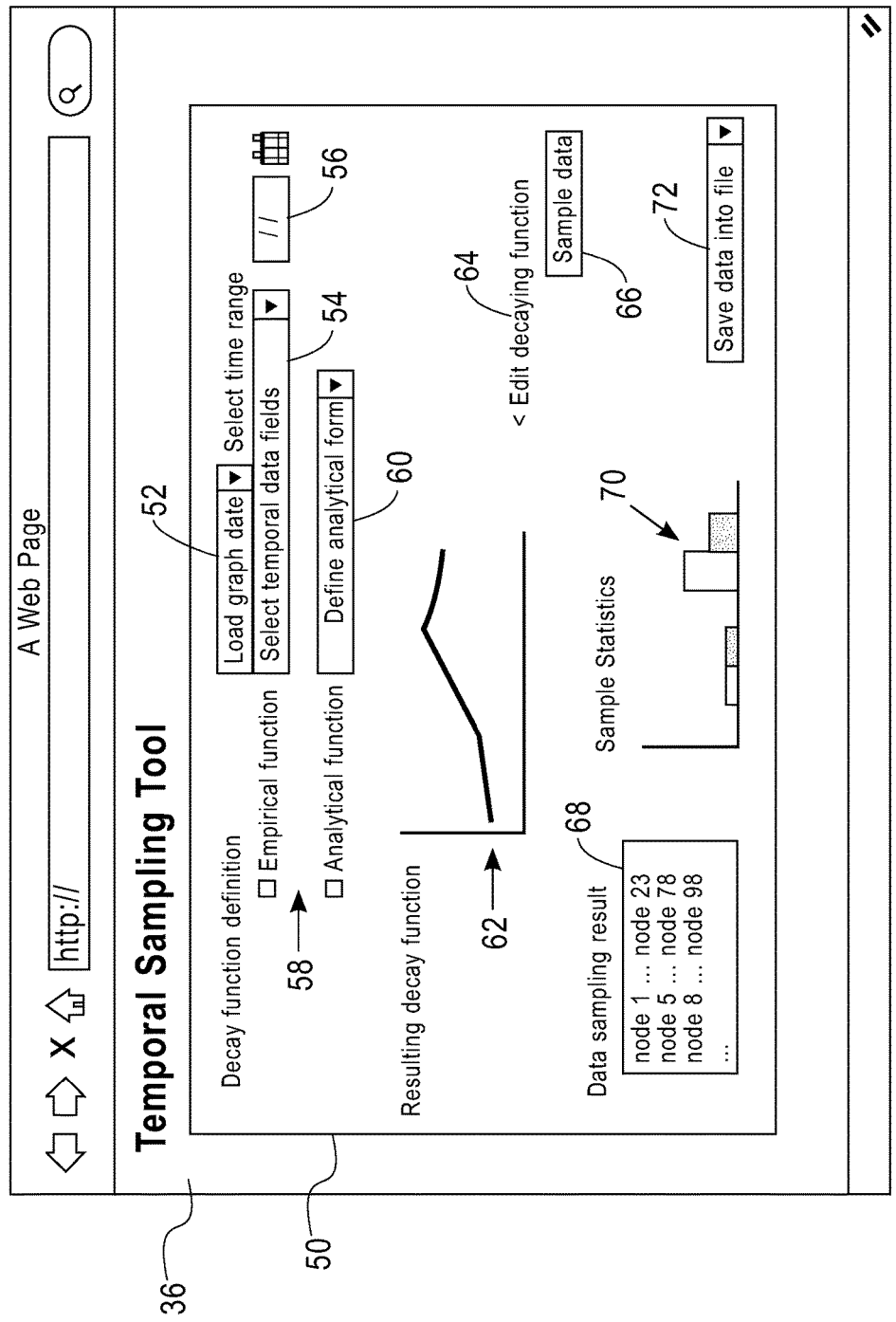
FIG. 3 is a screen shot of a user interface of one embodiment of the present invention.

FIG. 3 is a screenshot 50 of the user interface 36 having a temporal sampling tool according to one embodiment of the invention. In field 52 the data from a user selected data source is loaded from the database 32. In field 54 the user selects the temporal data fields for the attributes. The attributes may be any attribute that could be related with time, such as timestamps, year, days, hours or weight varying over time. In field 56 the user selects the time range for the temporal attributes. In field 58 the user selects the type of decay function, in this example, empirical or analytical. If analytical is selected, the user can define the analytical form in field 60.

In field 62 the resulting decay function is displayed to the user. An edit decay function field 64 allows the user to manipulate the function shown on the graph. Button 66 is pressed to execute the sampling of the data. Field 68 shows the data sampling result for each node, such as the edge list for the graph that was sampled. Field 70 displays sample statistics, such as number of nodes, edges, degree distribution, diameter, number of triangles and other measures. Field 72 allows the data to be saved o the data base 32.

Figure 4:
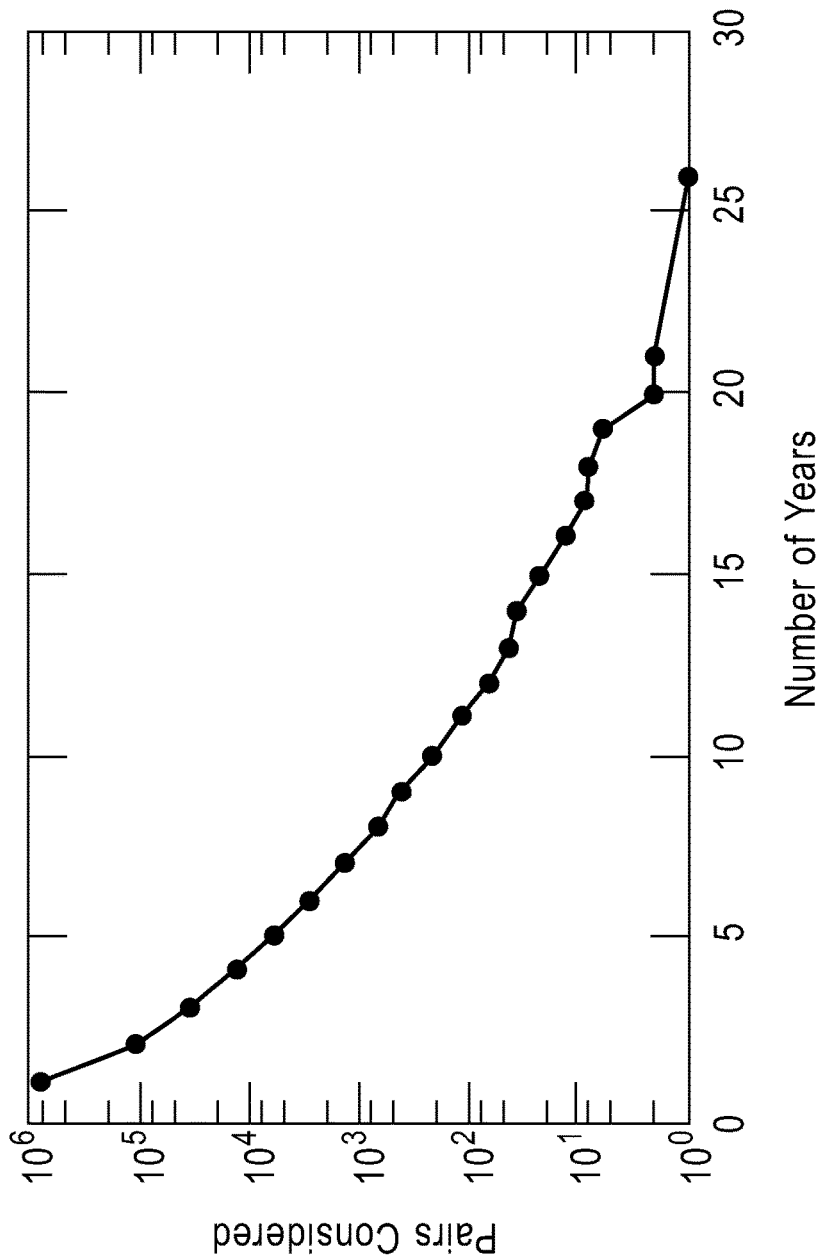
FIG. 4 is a sample time decay function of one embodiment of the present invention.

In one embodiment, the decay function is an empirical form which is derived from measured data indicating the way interactions decay. This form allows for tuning of the right cut-off in order to preserve the graph properties as clearly as possible. In another embodiment, an approximation for the decay function can be generated by means of an analytical form. This heuristic functional form will have a given set of properties depending on the problem. Particular possible functional forms include a stepwise functional form, a linear functional form, an exponential functional form, and a power-law functional form, among others. For example, one functional form may be: $A(t)=A_0 e^{kt}$, (exponential decay) or $A(t)=A_0-bt$ (linear decay). Variables involved in the functional form may include nodes, links, node degree, link/node weights, graph topological variables (node distance, shortest paths, etc.), community information and diffusion information. The choice of the functional form will depend on the measured decay function, method performance targets, and/or the capability of each functional form of presenting the different graph properties of interest. FIG. 4 is an example of an empirical function, in which the function is extracted from available data.

One example of the application of this invention is to reduce the necessity of companies use large volume of data represented as a network to discover useful information. For example, if a financial institution wants to analyze payment information, this data can be considered a network. People who pay vs. people/companies who receive the payment can be viewed as nodes in a network. Each payment is seen as a link and has a timestamp, thus this network is temporal. Instead of the financial institution using the hole database, possibly of many years, we can apply a temporal sampling presented in this disclosure. The method analyses the data and generates the link distribution over time, a time decay is evaluated and the proper time window is identified for that specific data set. The method will give as an output the volume of data that is a smaller but representative dataset, reducing costs involved in data storage and processing. Once that time window is, set, the graph sample is generated counting with recent transactions involving customer vs. clients.

In one embodiment, another application of the invention is for social networks. Given a large set of Twitter posts, we want to understand network related quantities such as what communities are there among the users associated to the posts, or which users are influencers, or other similar tasks such as to predict a post between users, among many examples. All of these tasks can potentially be quite difficult, possibly needing large quantities of resources such as time, computational power, memory, all with ultimately an economic impact, associated to the difficulty level of the task at hand. The present invention can significantly reduce these resources, by transforming the initial damsel in a reduced, much more manageable and relevant dataset. By defining the appropriate temporal decay function for the task at hand, it is possible to filter out those nodes and links that least impact the computation of the quantity of interest, thereby leaving the dataset with only the most relevant posts. This strategy can lead to faster computation, reduced resource allocation and improved quality in the network metrics.

Figure 5:
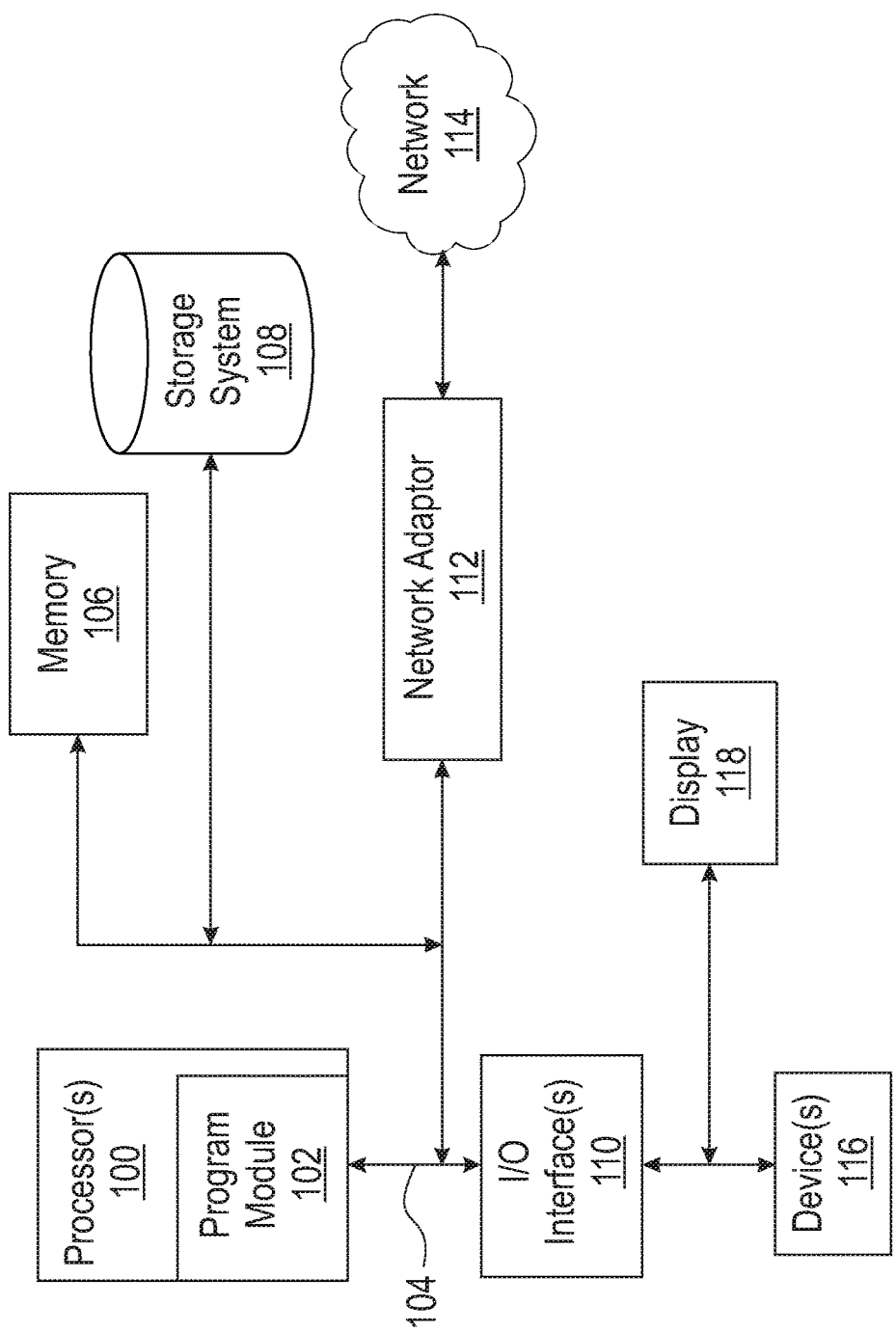
FIG. 5 is a block diagram of an exemplary computing system suitable for implementation of the present invention.

FIG. 5 shows, an exemplary computer system 100, which is applicable to implement embodiments of the present invention. As shown in FIG. 5, computer system 100 can include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among the above devices, CPU 101, RAM 102. ROM 103, Hard Drive Controller 105, Keyboard Controller 106, Serial Interface Controller 107, Parallel Interface Controller 108 and Display Controller 109 are coupled to System Bus 104. Hard Drive 110 is coupled, to Hard Drive Controller 105, Keyboard 111 is coupled to Keyboard. Controller 106. Serial Peripheral Equipment 112 is coupled to Serial Interface Controller 107. Parallel Peripheral Equipment 113 is coupled to Parallel Interface Controller 108. Display 114 is coupled to Display Controller 109. It should be understood that the structure as shown in FIG. 5 is only for exemplary purposes rather than any limitation to the present invention. In some cases, some devices can be added to or removed from computer system 100 based on specific situations.

As will he appreciated by one skilled in the art, aspects of the present invention can be embodied as a system, method, or computer program product. Accordingly, aspects of the present invention can take the form of an entirely hardware embodiment, an entirely software embodiment (including firmware, resident software, micro-code, etc,) or an embodiment combining software and hardware aspects that can all generally be referred to herein as a "circuit," "module," or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can he, for example, but not limited to, an electronic, magnetic, optical, electromagnetic, infrared, or semiconductor system, apparatus, or device, or any suitable combination of the above. More specific examples (a non-exhaustive list) of the computer readable storage medium can include the following: an electrical connection having one or more wires, a portable computer diskette, a hard disk, a random access memory (RAM, a read-only memory (ROM), an erasable programmable read-only memory (EPROM or Flash memory), an optical fiber, a portable compact disc read-only memory (CD-ROM), an optical storage device, a magnetic storage device, or any suitable combination of the above. In the context of this invention, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can, communicate, propagate, or transport a program for use by or in connection with an instruction execution system, apparatus, or device.

Program code embodied on a computer readable medium can be transmitted using any appropriate medium, including, but not limited to, wireless, wire line, optical fiber cable, RF, etc., or any suitable combination of the foregoing.

Computer program code for carrying out operations for aspects of the present invention can be written in any combination of one or more programming languages, including an object oriented programming language, such as Java, Smalltalk, C++, and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatuses (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram, block or blocks, These computer program instructions can also be stored in a computer readable medium that, can direct a computer, other programmable data processing apparatus, or other devices to function in a particular manner, such that the instructions stored in the computer readable medium produce an article of manufacture, including instruction means which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented method such that the instructions which execute on the computer or other programmable apparatus provide processes for implementing the functions/acts specified in the flowchart and/or block diagram block or blocks.

While the invention has been particularly shown and described with respect to illustrative and preformed embodiments thereof, it will he understood by those skilled in the art that the foregoing and other changes in form and details may be made therein without departing from the spirit and scope of the invention which should be limited only by the scope of the appended claims.

What is claimed is:

1. A computer implemented method for analyzing temporal data of a computer network to provide a computer generated graph of a temporally meaningful data sample comprising the steps of:

selecting a computer network data source in which data from the source contains temporal attributes, the data having a set of predefined data properties other than the temporal attributes;

obtaining a first data set of temporal data of a first size from the selected data source;

transforming the temporal data from the selected source into a computer generated temporal graph containing the set of predefined data properties;

selecting a temporal attribute;

generating a time decay function of the selected temporal attribute and fitting the time decay function into a temporal distribution of the selected temporal attribute in the temporal graph;

selecting a data sampling time window in the temporal graph defining a second data set of temporal data of a second size less than the first size based on the time decay function, such that the set of predefined data properties is substantially preserved within the data sampling window based on a calculation of metrics of the set of predefined data properties from data within the selected data sampling time window;

sampling data from the data source within the selected data sampling time window; and generating a computer generated temporal subsample graph of the metrics of the predefined data properties of the sampled network data.

2. The method of claim 1, wherein the set of predefined data properties includes one or more of degree distribution, distance, centrality measures, triangles, clustering coefficient and giant connected component.

3. The method of claim 1, further comprising:

presenting the selected data sampling time window and the calculated metrics of set of the predefined data properties to a user interface;

receiving an input on the user interface adjusting the data sampling time window;

recalculating the metrics of the predefined data properties based on the adjusted data sampling time window;

presenting the recalculated metrics of the predefined data properties to the user interface;

sampling data from the data source based on the adjusted data sampling time window; and generating a temporal graph of the recalculated metrics of the predefined data properties of the sampled data.

4. The method of claim 1, wherein the data source is a network of nodes and links connecting the nodes.

5. The method of claim 4, wherein the time decay function is derived from data which contains the information about how interactions in the links between the nodes decay.

6. The method of claim 5, wherein the time decay function is in a form of one of a stepwise functional form, a linear functional form, an exponential functional form, polynomial functional form, logarithmic functional form and a power-law functional form.

7. The method of claim 6, wherein the time decay function form is dependent on variables selected from the group consisting of nodes, links, node degree, link/node weights, link/node attributes graph topological variables, community information and diffusion information.

8. A computer system for analyzing temporal data of a computer network to provide a computer generated graph of a temporally meaningful data sample, comprising:

at least one computer processor;

at least one database storing data from a plurality of computer network data sources, the data containing temporal attributes, the data having a set of predefined data properties other than the temporal attributes;

a user interface configured to receive user inputs, the user inputs including a selection of one of the plurality of computer network data sources; and at least one memory connected to at least one computer processor that stores software instructions, where execution of the software instructions by the at least one data processor causes the system to:

obtain a first data set of temporal data of a first size from the selected data source and transform the temporal data from the selected source into a computer generated temporal graph containing the set of predefined data properties;

generate a time decay function of the selected temporal attribute selected by the user through an input on the user interface and fit the time decay function into a temporal distribution of the selected temporal attribute in the temporal graph;

select a data sampling time window in the temporal graph defining a second data set of temporal data of a second size less than the first size based on the time decay function, such that the set of predefined data properties is substantially preserved within the data sampling window based on a calculation of metrics of the set of predefined data properties from data within the selected data sampling time window; and sample data from the data source within the selected data sampling time window, generate a computer generated temporal subsample graph of the metrics of the predefined data properties of the sampled network data and display the temporal subsample graph on the user interface.

9. The computer system of claim 8, wherein the execution of the software instructions by the at least one data processor causes the system to present the selected data sampling time window and the calculated metrics of set of the predefined data properties to the user interface.

10. The computer system of claim 9, wherein execution of the software instructions by the at least one data processor causes the system to recalculate the metrics of the predefined data properties based on an input on the user interface adjusting the data sampling time window and present the recalculated metrics of the predefined data properties to the user interface.

11. The computer system of claim 10, wherein the execution of the software instructions by the at least one data processor causes the system to sample data from the data source based on the adjusted data sampling time window and generate a temporal subsample graph of the recalculated metrics of the predefined data properties of the sampled data and display the temporal subsample graph of the recalculated metrics on the user interface.

12. The computer system of claim 8 wherein the selected data source comprises a network of nodes and links connecting the nodes and wherein the time decay function is derived from data which contains the information about how interactions in the links between the nodes decay.

13. The computer system of claim 8, wherein the time decay function is dependent on variables selected from the group consisting of nodes, links, node degree, link/node weights, link/node attributes graph topological variables, community information and diffusion information.

14. A non-transitory article of manufacture tangibly embodying computer readable instructions, which when implemented, cause a computer to perform the steps of a method for analyzing temporal data of a computer network to provide a computer generated graph of a temporally meaningful data sample, the method comprising:

selecting a computer network data source in which data from the source contains temporal attributes, the data having a set of predefined data properties other than the temporal attributes;

obtaining a first data set temporal data of a first size from the selected data source;

transforming the temporal data from the selected source into a computer generated temporal graph containing the set of predefined data properties;

selecting a temporal attribute;

generating a time decay function of the selected temporal attribute and fitting the time decay function into a temporal distribution of the selected temporal attribute in the temporal graph;

selecting a data sampling time window in the temporal graph defining a second data set of temporal data of a second size less than the first size based on the time decay function, such that the set of predefined data properties is substantially preserved within the data sampling window based on a calculation of metrics of the set of predefined data properties from data within the selected data sampling time window;

sampling data from the data source within the selected data sampling time window; and generating a computer generated temporal subsample graph of the metrics of the predefined data properties of the sampled network data.

15. The non-transitory article of manufacture of claim 14, wherein the set of predefined data properties includes one or more of degree distribution, distance, centrality measures, triangles, clustering coefficient and giant connected component.

16. The non-transitory article of manufacture of claim 14, further comprising:

presenting the selected data sampling time window and the calculated metrics of set of the predefined data properties to a user interface;

receiving an input on the user interface adjusting the data sampling time window;

recalculating the metrics of the predefined data properties based on the adjusted data sampling time window;

presenting the recalculated metrics of the predefined data properties to the user interface;

sampling data from the data source based on the adjusted data sampling time window; and generating a temporal graph of the recalculated metrics of the predefined data properties of the sampled data.

17. The non-transitory article of manufacture of claim 14, wherein the data source is a network of nodes and links connecting the nodes.

18. The non-transitory article of manufacture of claim 17, wherein the time decay function is derived from data which contains the information about how interactions in the links between the nodes decay.

19. The non-transitory article of manufacture of claim 18, wherein the time decay function is in a form of one of a stepwise functional form, a linear functional form, an exponential functional form, polynomial functional form, logarithmic functional form and a power-law functional form.

20. The non-transitory article of manufacture of claim 19, wherein the time decay function form is dependent on variables selected from the group consisting of nodes, links, node degree, link/node weights, link/node attributes graph topological variables, community information and diffusion information.

* * * * *